Jan. 19, 1932.   W. D. DAVIDSON   1,841,792
CROWN BLOCK
Filed Oct. 29, 1930   2 Sheets-Sheet 1

INVENTOR:
William D. Davidson,
BY
ATTORNEY.

Jan. 19, 1932.  W. D. DAVIDSON  1,841,792
CROWN BLOCK
Filed Oct. 29, 1930  2 Sheets-Sheet 2
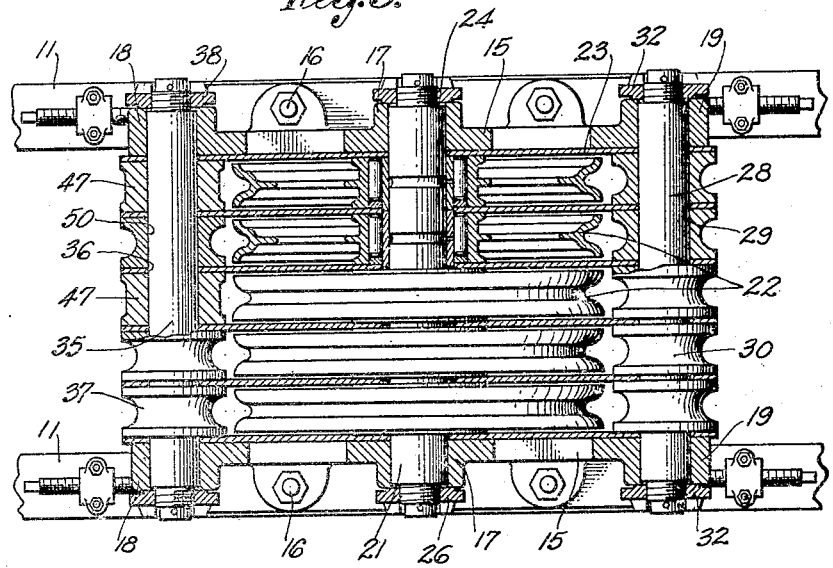
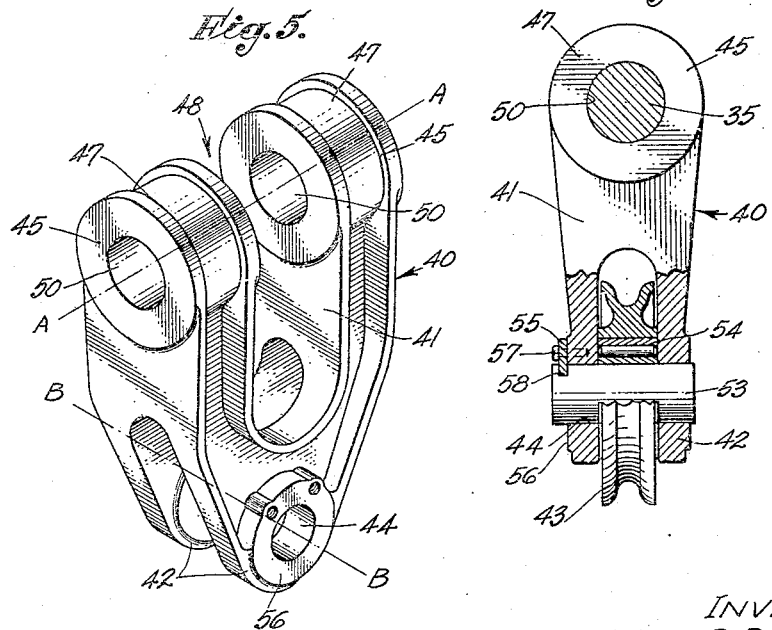
INVENTOR:
William D. Davidson,
BY
ATTORNEY.

Patented Jan. 19, 1932

1,841,792

UNITED STATES PATENT OFFICE

WILLIAM D. DAVIDSON, OF LOS ANGELES, CALIFORNIA, ASSIGNOR TO EMSCO DERRICK & EQUIPMENT COMPANY, OF LOS ANGELES, CALIFORNIA, A CORPORATION OF CALIFORNIA

CROWN BLOCK

Application filed October 29, 1930. Serial No. 491,958.

My invention relates to crown blocks for use on derricks, and the object of my invention is to provide a crown block having a cat-line sheave incorporated therein in such a manner that the structure will be very rigid and strong, and to provide a structure in which a cat-line sheave support cooperates with certain other parts of the crown block in a novel manner which will be fully described in the following specification.

The crown block of this invention has a plurality of sheaves supported on a shaft and separated by plates. The plates have openings through which a securing shaft is extended, and placed between the plates are spacers. There is a means provided for clamping the plates and spacers together in order to procure a rigid structure. The cat-line sheave support has a pair of spaced arms which have spacing formations at their upper ends, which formations are separated by a distance equal to the thickness of a pair of plates and one spacer. The parts are assembled so that the securing shaft extends through the formations and so that there is a spacer between the formations and a plate on each side of the spacer. The clamping means for clamping the parts together rigidly clamps the formations, the spacers, and the plates in order that a rigid structure is provided. Carried by the cat-line support is a cat-line sheave over which a rope or cable may be extended.

Various objects and advantages of my invention will be pointed out in the following detailed description, in which description reference will be had to the accompanying drawings.

Referring to the drawings,—

Fig. 3 is a section taken on the line 3—3 of Fig. 1.

Fig. 4 is a section taken on the line 4—4 of Fig. 2.

Fig. 5 is a perspective view of the cat-line support.

Figure 1:
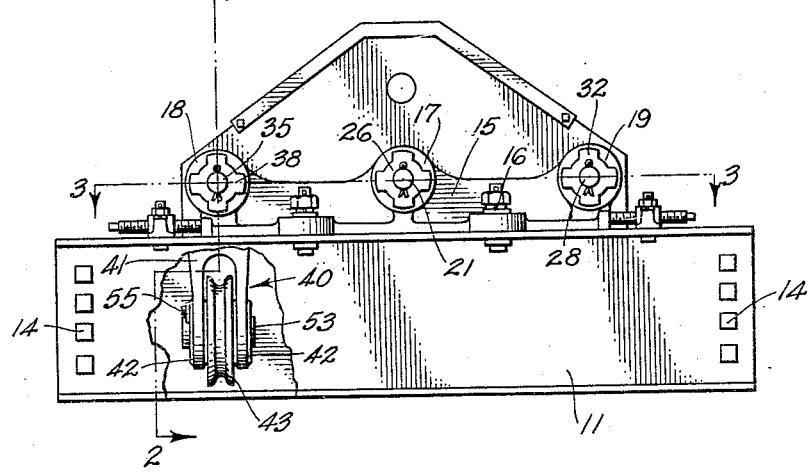
Fig. 1 is a side elevational view of my crown block.

Referring to the drawings in detail, the numeral 11 represents a pair of supporting I-beams which are secured in spaced relation by spacing channels 12, the members 11 and 12 being secured together by angle plates and bolts 14. Supported on the supporting beams 11 are end castings or steel bars 15 which are secured in place by suitable bolts 16, the bolts 16 extending through the steel bars 15 and also through flanges on the supporting beams 11. The steel bars 15 are provided with central bearing portions 17 and end bearing portions 18 and 19. The central bearing portion 17, as shown best in Fig. 3, carries a sheave-supporting shaft 21 on which sheaves 22 are rotatably mounted. The sheaves 22 are maintained in spaced relation and are separated by plates 23 having openings 24 provided therein through which the sheave-supporting shaft 21 is extended. Secured on the ends of the shaft 21 are suitable nuts 26 by means of which the parts are secured together. Extended through the bearing 19 is an end shaft 28 which extends through openings 29 provided in the plates 23. Placed between the plates 23 and surrounding the shaft 28 are spacers 30 which are slightly thicker than the sheaves 22 in order that the plates may be held in such a spaced relation that the sheaves will not be engaged. Nuts 32 are screwed onto the ends of the shaft 28 for clamping the parts together. The bearings 18 support a shaft 35 which extends parallel to the shafts 21 and 28 and which extends through openings 36 provided in the plates 23.

Between certain of the plates 23 are spacers 37 which are of substantially the same size and shape as the aforementioned spacers 30. Screwed onto the ends of the shaft 35 which project outward from the bearings 18 are nuts 38 which clamp the parts together.

Supported by the shaft 35 is a cat-line sheave means 40 which by itself and in combination with the other parts of the crown block constitutes my invention. As shown best in Fig. 5, the cat-line sheave means 40 includes a support 41. This support 41 has a pair of depending legs 42 which are spaced apart sufficiently to receive a cat-line sheave 43. The depending legs 42 have openings 44 which are aligned on an axis B—B, which axis B—B extends at right angles to the plane on which the space between the legs 42 extends. Projecting upward from the depending legs 42 are arms 45, the upper ends of which are provided in the form of spacing formations 47. It will be noted that the arms 45 are separated by a space 48 which is disposed in a plane at right angles to the plane on which the space between the legs 42 is located, but parallel to the axis B—B. Formed in the formations 47 are openings 50 adapted to receive the shaft 35.

Figure 2:
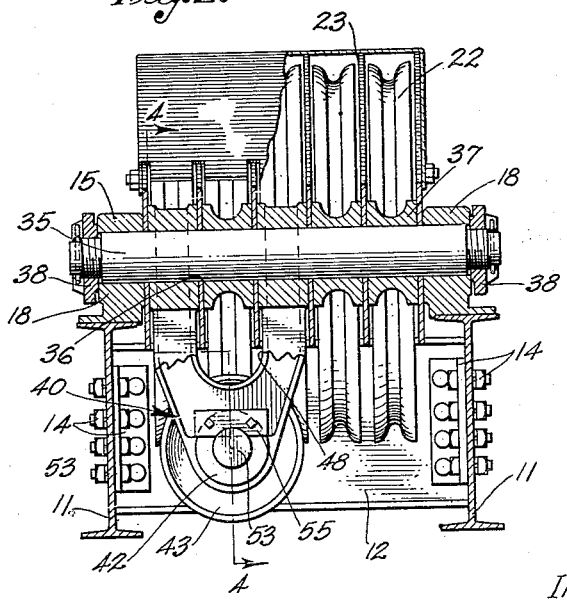
Fig. 2 is a section taken on the line 2—2 of Fig. 1.

Referring to Fig. 2 in particular, it will be noted that the space 48 between the formations 47 is wide enough to receive two adjacent plates 23 and one of the spacers 37 which rests between these plates. The formations 47 furthermore are of the same thickness as the spacers 37, so that they themselves act as spacing means for the plates 23 as well as a part of the support for the sheave 43. When the parts are assembled as shown in the drawings, particularly in Fig. 2, the nuts 38 clamp the formations 47, the plates 23, and the spacers 37 rigidly together, and cooperate with the other parts of the crown block to provide a very rigid structure.

Carried in the openings 44 is a short shaft 53 which supports the sheave 43, there being a suitable bearing 54 provided. The shaft 53 is locked from rotational and axial movement by means of a lock-plate 55 which is secured against a face 56 of one of the legs 42 by suitable machine screws 57. The shaft 53 has a transverse groove 58 formed in it into which the lock-plate 55 is extended.

From the foregoing description it will be seen that the plates 23 are rigidly secured in spaced relation by means of the spacers 30, the shaft 28 which projects through the steel bars 15, and the nuts 32 screwed onto the ends of the shaft 28, and at the opposite end of the crown block by the spacers 37, the formations 47, the shaft 35 which projects through the bearings 18 of the steel bars 15, and the nuts 38 which are screwed onto the ends of the shaft 35. The cat-line sheave support cooperates with the spacers 37 in spacing the plates 23 and is rigidly secured in place. The utilization of the support 41 in this novel manner enables a relatively simple design to be utilized, and the design is such that the crown block is of rigid construction.

When the term "cat-line sheave means" or "cat-line sheave support" is used, I do not intend to limit myself to the use of the sheave 43 for any particular purpose in a derrick. The sheave 43 is adapted to carry any rope which may be used for lifting or for other purposes in the derrick.

I believe the combination of the essential parts of the crown block and the support 41 cooperating in the novel manner specified to be broadly new, and that I am entitled to broad protection thereon. I further believe that the design of the support 41 is broadly new and that I am entitled to broad protection on an article of manufacture including the characteristic thereof.

I claim as my invention:

1. In a crown block construction including sheaves and means whereby said sheaves are rotatably supported, the combination of: plates disposed between said sheaves; spacers between said plates; means for securing said plates and said spacers together; and cat-line sheave means carried by certain of said spacers.

2. In a crown block construction including sheaves and means whereby said sheaves are rotatably supported, the combination of: plates disposed between said sheaves; spacers between said plates; means for securing said plates and said spacers together; and cat-line sheave means carried by certain of said spacers, said last named means having a support formed integral with certain of said spacers.

3. In a crown block construction including sheaves and means whereby said sheaves are rotatably supported, the combination of: plates disposed between said sheaves and having openings therein; spacers between said plates and having openings therein; means for securing said plates and said spacers together, said means having a shaft extending through said openings; and cat-line sheave means carried by certain of said spacers.

4. In a crown block construction including sheaves and means whereby said sheaves are rotatably supported, the combination of: plates disposed between said sheaves and having openings therein; a shaft extending through said openings; a cat-line sheave support having a pair of spacing formations with openings therein and having a space therebetween sufficient to receive two of said plates, said shaft extending through said openings in said formations; a spacer with an opening, disposed between said two plates, said shaft extending through said opening of said spacer; and clamping means for clamping said formations, said spacer, and said plates on said shaft.

In testimony whereof, I have hereunto set my hand at Los Angeles, California, this 22 day of October, 1930.

WILLIAM D. DAVIDSON.